(12) United States Patent
Dring et al.

(10) Patent No.: US 8,321,708 B2
(45) Date of Patent: Nov. 27, 2012

(54) INTERFACING MEDIA ACCESS CONTROL (MAC) WITH A LOW-POWER PHYSICAL LAYER (PHY) CONTROL

(75) Inventors: John Dring, San Jose, CA (US); Jose Tellado, Mountain View, CA (US); Dimitry Taich, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 685 days.

(21) Appl. No.: 12/384,298

(22) Filed: Apr. 2, 2009

(65) Prior Publication Data
US 2010/0257391 A1 Oct. 7, 2010

(51) Int. Cl.
G06F 1/32 (2006.01)
G06F 1/00 (2006.01)
(52) U.S. Cl. .......... 713/323; 713/320; 713/324
(58) Field of Classification Search ........ 710/53, 710/56, 117, 124, 310; 713/320, 323, 324
See application file for complete search history.

(56) References Cited

U.S. PATENT DOCUMENTS

| | | | | |
|---|---|---|---|---|
| 5,835,498 A * | 11/1998 | Kim et al. | | 370/537 |
| 6,834,085 B1 * | 12/2004 | Leonowich et al. | | 375/316 |
| 2002/0063932 A1 * | 5/2002 | Unitt et al. | | 359/168 |
| 2002/0157030 A1 * | 10/2002 | Barker et al. | | 713/320 |
| 2005/0163149 A1 * | 7/2005 | Unitt et al. | | 370/442 |
| 2005/0198065 A1 * | 9/2005 | Eppley et al. | | 707/104.1 |
| 2006/0165108 A1 * | 7/2006 | Uysal | | 370/412 |
| 2010/0142600 A1 * | 6/2010 | Ahrndt et al. | | 375/219 |

FOREIGN PATENT DOCUMENTS

JP 11272588 A * 10/1999

OTHER PUBLICATIONS

Parker, A.C., et al. "Hardware/Software Tradeoffs in a Variable Word Width, Variable Queue Length Buffer Memory". Proceedings of the 4th annual symposium on Computer architecture (ISCA '77). 1977. ACM. New York, NY, USA. pp. 159-164.*

* cited by examiner

*Primary Examiner* — Thomas J Cleary
(74) *Attorney, Agent, or Firm* — Brian R. Short (57) ABSTRACT

An apparatus and method of interfacing physical layer (PHY) control with media access control (MAC) is disclosed. One method includes signaling to the PHY control to operate in a low-power mode when the MAC is detected to be transmitting idle patterns. The MAC transitioning from transmitting the idle patterns to transmitting data can be detected. When the transition is detected, the PHY control is signaled to transition to a wake up mode. Data from the MAC is buffered while the PHY control is in the wake up mode. The buffered data is provided to the PHY control after the PHY control has completed the wake up mode.

12 Claims, 8 Drawing Sheets

INTERFACING MEDIA ACCESS CONTROL (MAC) WITH A LOW-POWER PHYSICAL LAYER (PHY) CONTROL

FIELD OF THE INVENTION

The invention relates generally to communication systems. More particularly, the invention relates to interfacing a MAC with a low-power PHY, providing control of activation and deactivation of electronic circuitry of data ports of a communication system.

BACKGROUND OF THE INVENTION

High-speed LAN technologies using copper cables include 10BASE-T, 100BASE-T (Fast Ethernet), 1000BASE-T (Gigabit Ethernet), and 10GBASE-T. These high-speed LAN technologies include link partner transceivers that can communicate, for example, over a bi-directional transmission channel. An exemplary transmission channel includes four pairs of copper wire.

Proper operation of the Ethernet link partner transceivers requires them to be synchronized. Synchronization can be obtained by one link partner phase-locking a clock to data signals transmitted by the other link partner. The transmitter and receiver processing of the transceiver link partners are clocked by the phase-locked clock.

In order to maintain synchronization, and to minimize latency of data transmission between the link partners, the transmitting and receiving link partners of 10BASE-T systems maintain full operational power even when no data transmission is occurring. However, continually maintaining full operation of the transceiver link partners consumes significant amounts of power, typically, the majority of the power consumption required to maintain the link between the transceiver link partners.

It is desirable to have a system, apparatus and method of reducing the power dissipated by electrically connected transceivers without substantially impacting the operating performance of the transceivers.

SUMMARY OF THE INVENTION

An embodiment includes a method of interfacing physical layer (PHY) control with media access control (MAC). The method includes signaling to the PHY control to operate in a low-power mode when the MAC is detected to be transmitting idle patterns. The MAC transitioning from transmitting the idle patterns to transmitting data can be detected. When the transition is detected, the PHY control is signaled to transition to a wake up mode. Data from the MAC is buffered while the PHY control is in the wake up mode. The buffered data is provided to the PHY control after the PHY control has completed the wake up mode.

Another embodiment includes a method of controlling electronic circuitry of a data port, the data port including physical layer (PHY) control interfaced with a media access control (MAC). The method includes signaling to the PHY control to operate in a low-power mode when the MAC is detected to be transmitting idle patterns. The data port deactivates electronic circuitry of the data port when the PHY control is in the low-power mode. The data port maintains synchronization with a link partner port while the electronic circuitry is deactivated by periodically exchanging synchronization test patterns with the link partner port. The MAC transitioning from transmitting the idle patterns to transmitting data can be detected. When the transition is detected, the PHY control is signaled to transition to a wake up mode, and the data port transmits an alert to the link partner port. Data from the MAC is buffered while the PHY control is in the wake up mode. Buffered data is provided to the PHY control after the PHY control has completed the wake up mode, and the data port transmits the data.

Another embodiment includes a method of interfacing physical layer (PHY) control with media access control (MAC). The method includes signaling to the PHY control to operate in a low-power mode when the MAC provides a low-power mode indicator. The MAC buffers data of the MAC. An indicator that the MAC is transitioning from transmitting idle patterns to transmitting data is received. When the transition is detected, the PRY control is signaled to transition to a wake up mode. Buffered data is provided to the PHY control after the PHY control has completed the wake up mode.

Other aspects and advantages of the described embodiments will become apparent from the following detailed description, taken in conjunction with the accompanying drawings, illustrating by way of example the principles of the described embodiments.

DETAILED DESCRIPTION

The described embodiments includes an apparatus and method for reducing power dissipation of operating connected data ports while minimally impacting latency of data communication between data ports.

It is to be appreciated that the present teaching is by way of example, not by limitation. Therefore, although the embodiments described herein are for convenience of explanation, it is to be appreciated that the principles herein may be applied equally to other configurations of power conservation of communications between link partner transceivers.

Figure 1:
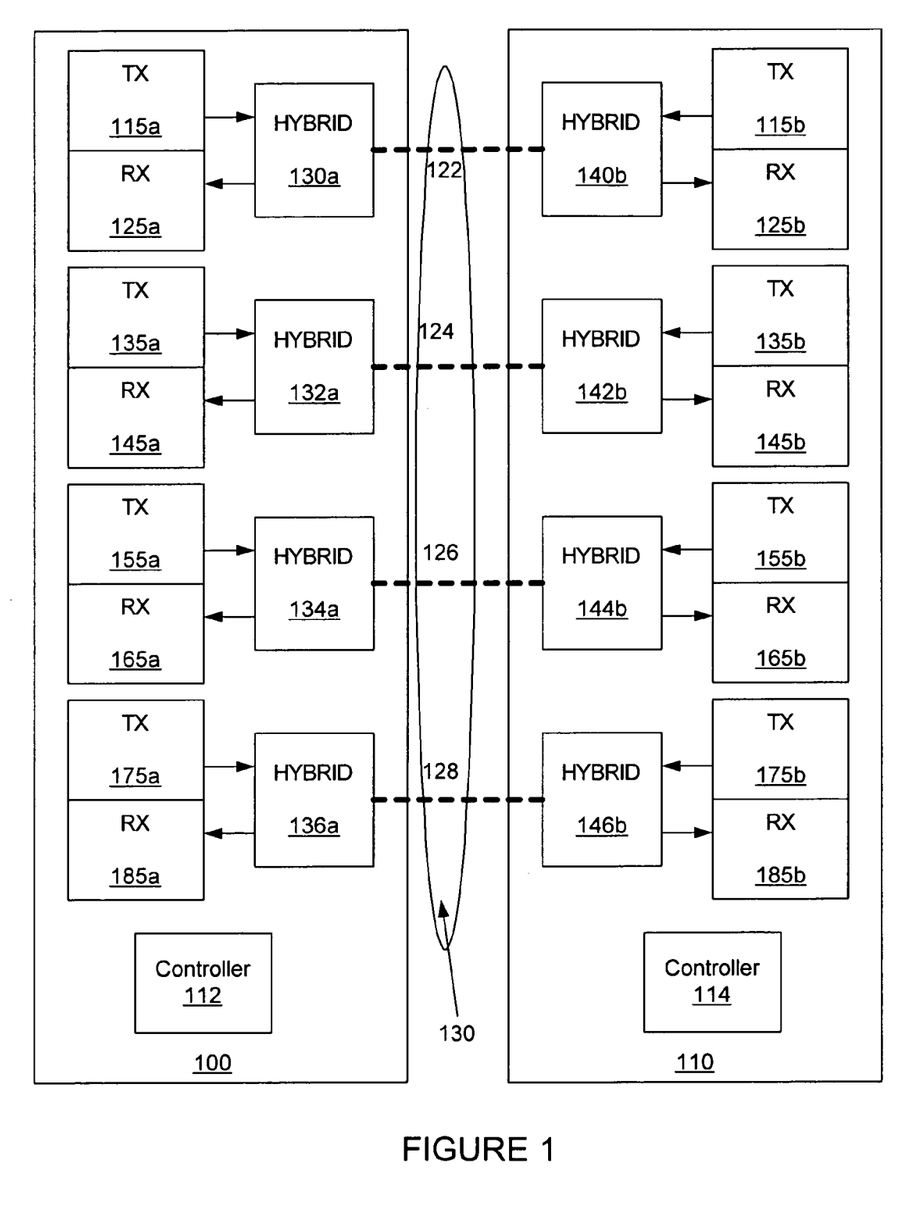
FIG. 1 shows one example of a first transceiver and a second transceiver connected by a cable that can maintain synchronization between the transceivers, and minimize power dissipation of the transceivers while minimally impacting data transmission latency of data transmitted between the transceivers.

FIG. 1 shows one example of a first transceiver 100 and a second transceiver 110 connected by a cable 130. According to described embodiments, the transceivers 100, 110 maintain synchronization between the transceivers 100, 110, and minimize power dissipation of the transceivers 100, 110 while minimally impacting data transmission latency of data transmitted between the transceivers 100, 110.

As shown, the exemplary cable 130 includes four "lanes" 122, 124, 126, 128. Data ports of the transceivers 100, 110 are electrically connected though wire connections of the lanes 122, 124, 126, 128. As shown, each of the transceivers 100, 110 includes four separate front-end portions and joint logic portion.

The embodiment of FIG. 1 includes the first connection 122 between a first transceiver (first transmitter 115a and first receiver 125a), and a second transceiver (second transmitter 115b and a second receiver 125b). The second connection 124 is between a third transceiver (third transmitter 135a and third receiver 145a), and a transceiver (fourth transmitter 135b and a fourth receiver 145b). The third connection 126 is between a fifth transceiver (fifth transmitter 155a and fifth receiver 165a), and a sixth transceiver (sixth transmitter 155b and a sixth receiver 165b). The fourth connection 128 is between a seventh transceiver (seventh transmitter 175a and seventh receiver 185a), and an eighth transceiver (eighth transmitter 175b and an eighth receiver 185b). This embodiment additionally includes hybrid circuits 130a, 140b, 132a, 142b, 134a, 144b, 136a, 146b between the transmitters and receivers.

The transceivers 100, 110 include processing (controllers 112, 114) that control data path configurations of the transceivers 100, 110. When data transmission has at least temporarily ceased, the transceivers 100, 110 deactivate selected portions of electronic circuitry, allowing the transceivers 100, 110 to operate at lower power consumption levels. During the periods of deactivated electronic circuitry, the transceivers 100, 110 maintain synchronization with each other by periodically activating selected portions of the electronic circuitry for updating parameters, and exchanging synchronization patterns. The deactivated circuitry is selectable, but generally, at least timing circuitry of the transceivers 100, 110 is activated when synchronization patterns are exchanged between transceivers 100, 110.

While de-activated, a transceiver detecting the data for communication transmits an alert signal to the other transceiver (link partner). The alert signal prompts the other transceiver to reactivate its electronic circuitry. After reactivating electronic circuitry, and after a wake up period, the transceivers restart data transmission. If timing of the alert signal and wake up are properly controlled, the impact on the network throughput (data throughput between the transceivers 100, 110) due to deactivation of the electronic circuitry can be minimized. The wake up period is a period of time in which the electronic circuitry reactivates, and signal processing (such as re-establishing signal processing coefficients of equalizers and echo cancellers) is updated.

While PHY control circuitry is being developed for providing the above-described methods of conserving power by deactivating circuitry, legacy MAC control circuitry is and will remain in circulation well after embodiments of the low-power PHY control circuitry are available. Therefore, there is a need for an interface that allows legacy MAC control circuits to operate with the embodiments of low-power PHY control circuitry. An embodiment of the interface is included within PHY control circuits. Other embodiments include the interface being independent from the PHY control circuits, and in some embodiments, being included within the MAC circuits.

Figure 2:
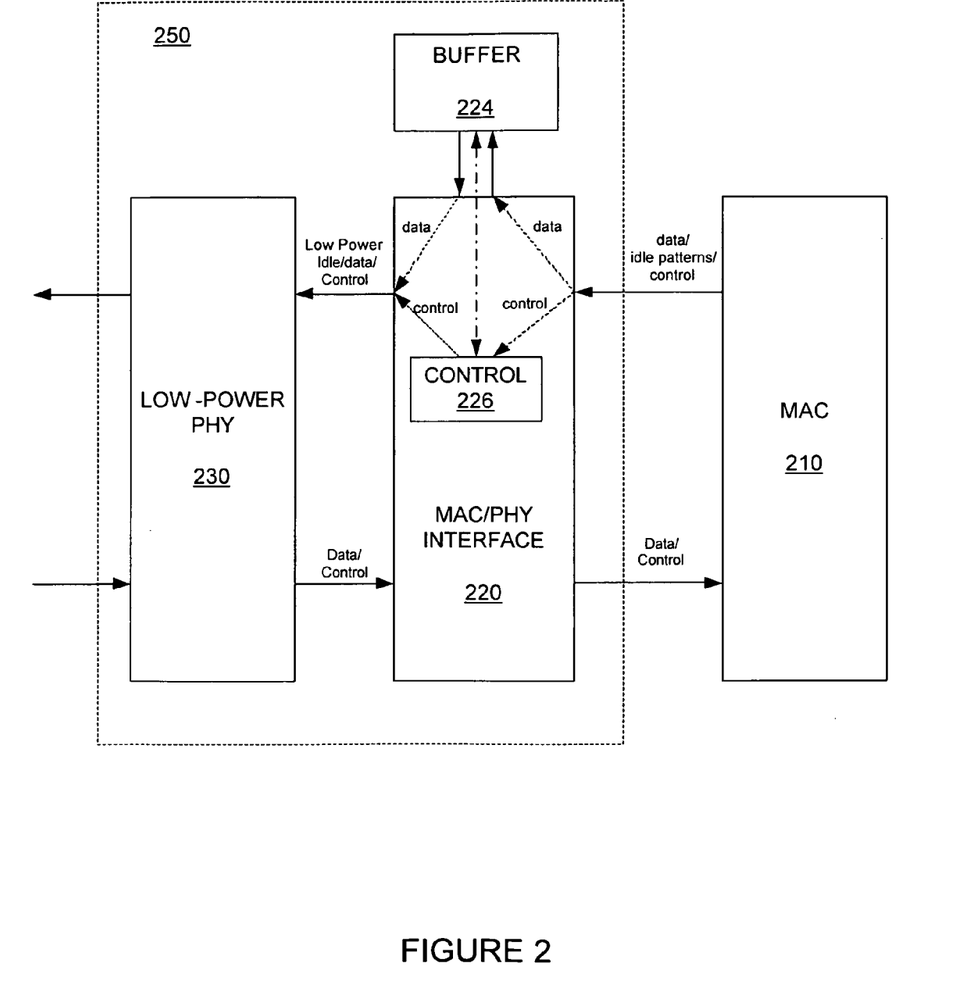
FIG. 2 shows an example of a MAC interfaced with a low-power PHY.

FIG. 2 shows an example of a MAC 210 interfaced with a low-power PHY 230. As shown, interface control is provided by a MAC/PHY interface 220. The interface 220 receives data and idle patterns from the MAC 210. In certain situations (for example, when the MAC 210 generates a large percentage of idle patterns compared to data) it makes sense for the low-power PHY 230 to operate in a low-power mode, and therefore, conserve power. The interface 220 monitors the idle patterns and data generated by the MAC 210, and when appropriate, signals to the PHY 230 to operate in the low-power mode, and therefore, reduce the power dissipated by the PHY 230. Deactivation of electronic circuitry of the PHY 230 while in low/no data periods can provide a reduction of power dissipation of as much as 90%.

Generally, the PHY 230 operates in an active state (data transfer occurring) or a low power state (idle state). The low power state can include an idle state and a wake up state (wake up mode). During the wake up state, the PHY 230 is transitioning from the idle state to the active state. A "powering up" state occurs during the wake up mode.

A buffer 224 of the interface 220, buffers data from the MAC 210 while the PHY 230 is "waking up" from the low-power mode. When the interface 220 detects that the MAC has data for the PHY, the interface signals to the PHY to wake up. However, while the PHY is transitioning from having deactivated circuitry to being fully activated, the PHY cannot receive data. The buffer 224 allows for buffering of the data from the MAC while the PHY wakes up, and is fully activated.

An embodiment includes maintaining a constant buffering queue, wherein the constant buffering queue is user selectable. That is, the constant buffering queue maintains an approximately constant latency of data propagating from the MAC through the PHY control. Another embodiment includes maintaining a variable buffering queue. The variable buffering queue can be user selectable. Generally, the variable buffering queue results in a variable latency of data propagating from the MAC through the PHY control. The size of the buffer can be selected based on how long it takes for the PHY control to reactivate its electronic circuitry after deactivation. That is, the buffer is selected based on how long it takes for the PHY control to "wake up".

A controller 226 extracts control information, such as, "start of packet" or "end of packets" and others, from the data/idle patterns from the MAC 210. The control information is generally defined by standards, such as the IEEE standards. The low power idle is not always precisely defined, and the interface 220 manages the low power idle allowing for proper operation of the low-power mode of the PHY control 230.

The low-power PHY 230 in combination with the MAC/PHY interface 220, provides a low-power interface with a link partner of the data port that includes the low-power PHY 230 and the MAC/PHY interface 220. The low-power PHY 230 provides the link partner with refresh and alert signals as will be described.

The MAC/PHY interface 220 can be located with the low-power PHY 230 in a single integrated circuit (as indicated in FIG. 2 by 250). Alternatively, the MAC/PHY interface 220 can be separately located, or located within a common integrated circuit as the MAC 210. Another embodiment includes the MAC 210, the MAC/PHY interface 220 and the PHY 230 all located on a common integrated circuit.

The interface 220 provides the PHY 230 with low-power idles, data and controls. The PHY 230 also provides the interface 220 with data and control information. In some situations (such as, when the MAC 210 does not support some types of control information) the interface 220 modifies the control information before passing it on to the MAC 210.

Figure 3:
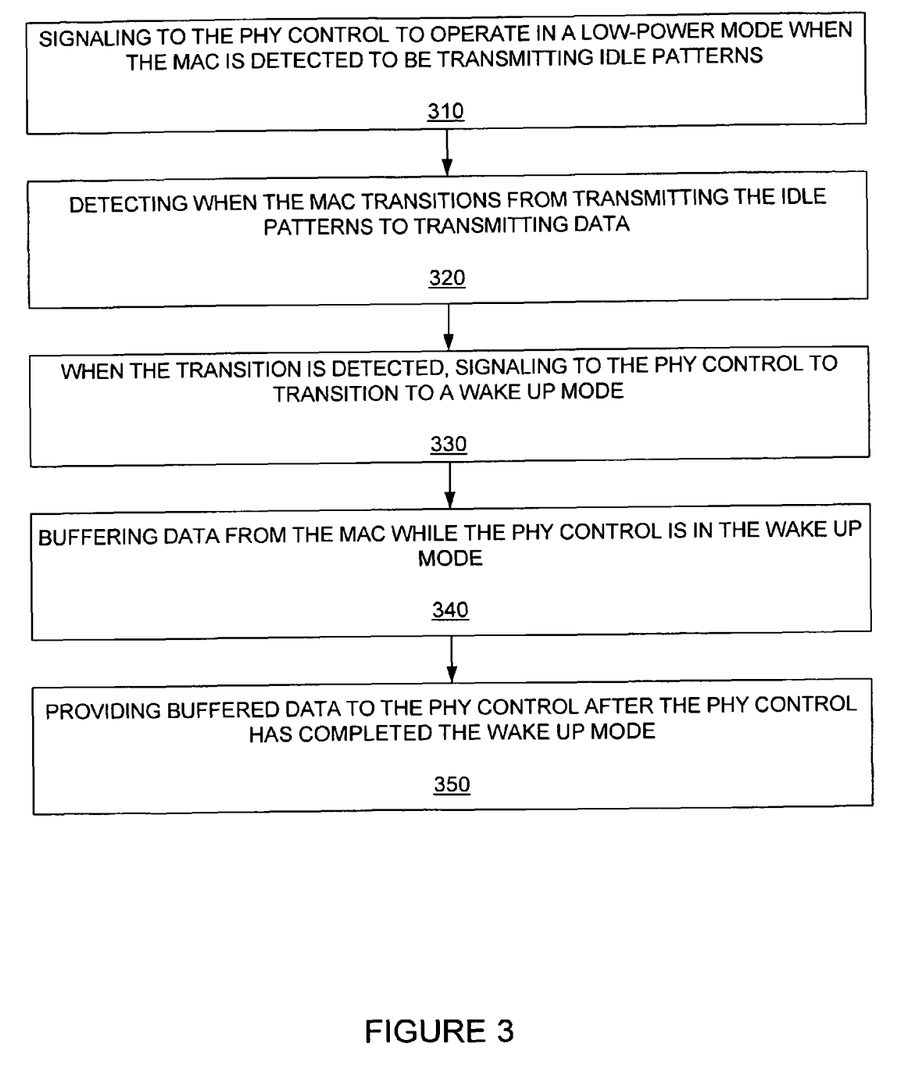
FIG. 3 is a flow chart that includes steps of one example of a method of interfacing physical layer (PHY) control with media access control (MAC).

FIG. 3 is a flow chart showing steps of one example of method of interfacing physical layer (PHY) control with media access control (MAC). A first step 310 includes signaling to the PHY control to operate in a low-power mode when the MAC is detected to be transmitting idle patterns. A second step 320 includes detecting when the MAC transitions from transmitting the idle patterns to transmitting data. When the transition is detected, a third step 330 includes signaling to the PHY control to transition to a wake up mode. A fourth step 340 includes buffering data from the MAC while the PHY control is in the wake up mode. A fifth step 350 includes providing buffered data to the PHY control after the PHY control has completed the wake up mode. It is to be understood that the steps 310-350 can (in fact, typically) loop from step 350 back to step 310).

For an embodiment, signaling to the PHY control to operate in a low-power mode when the MAC is detected to be transmitting idle patterns includes detecting idle patterns occurring above a threshold percentage of time. The detection can occur, for example, over a period of time. For another embodiment, detecting the MAC is transmitting idle patterns includes detecting a threshold number of consecutive idle patterns transmitted by the MAC. Once detected, the interface signals to the PHY control to operate in the low-power mode.

For an embodiment, detecting when the MAC transitions from transmitting the idle patterns to transmitting data includes detecting data from the MAC occurring above a threshold percentage of time. Another embodiment includes detecting a threshold number of data from the MAC.

As previously shown and described, embodiments of the interface between the PHY control and the MAC include buffering of data from the MAC. An embodiment includes maintaining a constant buffering queue, wherein the constant buffering queue is user selectable. That is, the constant buffering queue maintains an approximately constant latency of data propagating from the MAC through the PHY control.

Another embodiment includes maintaining a variable buffering queue. The variable buffering queue can be user selectable. Generally, the variable buffering queue results in a variable latency of data propagating from the MAC through the PHY control.

When idle patterns are received after data, the buffering queue can be depleted. That is, the data within the buffer can be gradually or quickly depleted if the MAC stops providing new data. Eventually, the buffer is completely depleted if no new data is provided by the MAC.

Figure 4:
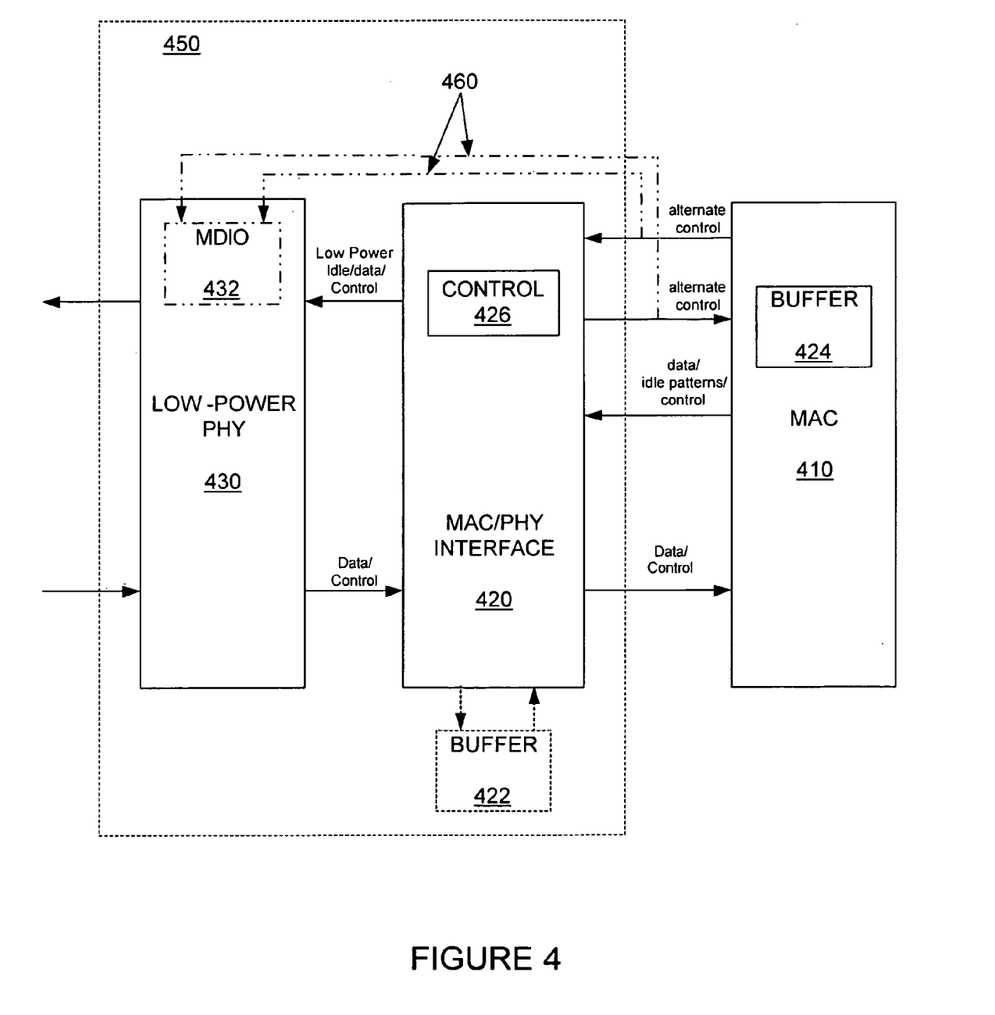
FIG. 4 shows another example of a MAC interfaced with a low-power PHY.

FIG. 4 shows another example of a MAC interfaced with a low-power PHY. For this embodiment, the MAC 410 includes a buffer 424 in which data of the MAC 410 can be buffered while the Low-Power PHY 430 is transitioning from the low-power mode to a fully-powered mode. Additionally, the MAC 410 provides and receives controls (alternate controls). One alternate control provided by the MAC 410 is a low-power mode indicator that indicates that the MAC 410 does not have data, and therefore, the PHY 430 should operate in the low-power mode. When the MAC 410 is or is to transition from transmitting idle patterns to transmitting data, the alternate control can include a transition indicator. The MAC/PHY interface 420 conveys the transition indicator to the PHY 430, causing the PHY to "wake up" from the low-power mode, and transition into the fully-powered mode. When the PHY has fully waken up (powered up), another alternate control can include a data indicator to indicate to the MAC 410 that the PHY 430 has woken up, and can receive data. The data of the MAC 410 can then be transmitted through the MAC/PHY interface 420 to the PHY 430. If the data has been buffered in the buffer 424, the data can obtained from the buffer 424 for transmission to the PHY 430. The MAC/PHY interface 420 includes a controller 426.

One alternate embodiment includes the MAC 410 interacting directly with the PHY 430 through an MDIO (Management Data Input/Output) interface 460 rather than through the alternate controls. For this embodiment, the PHY 430 includes MDIO interface controls 432.

It is to be understood that embodiments include the buffering being located within at least the PHY (such as buffer 422) or the MAC (such as buffer 424).

Figure 5:
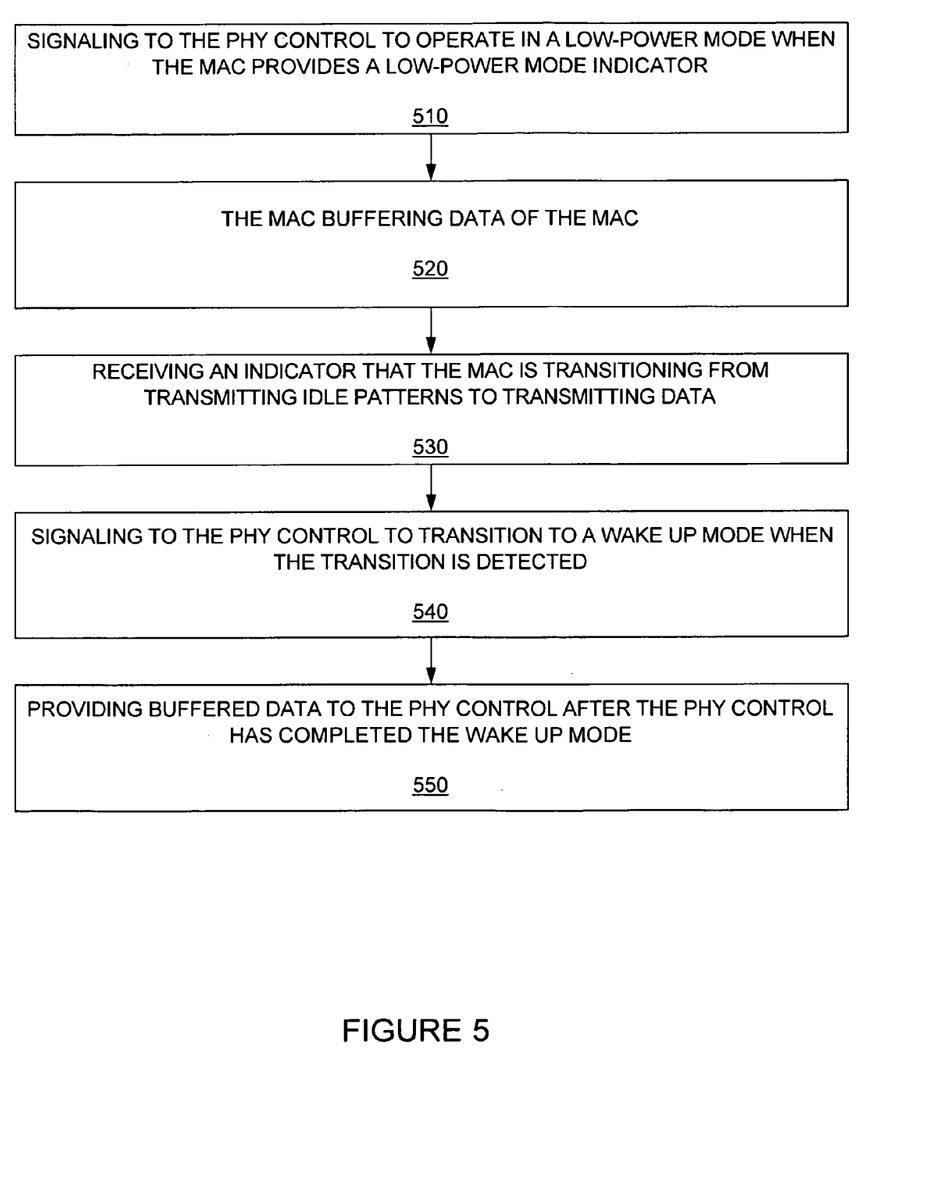
FIG. 5 is a flow chart that includes steps of another example of a method of interfacing physical layer (PHY) control with media access control (MAC).

FIG. 5 is a flow chart that includes steps of another example of a method of interfacing physical layer (PHY) control with media access control (MAC). A first step 510 includes signaling to the PHY control to operate in a low-power mode when the MAC provides a low-power mode indicator. A second step 520 includes the MAC buffering data of the MAC. A third step 530 includes receiving an indicator that the MAC is transitioning from transmitting idle patterns to transmitting data. A fourth step 540 includes signaling to the PHY control to transition to a wake up mode when the transition is detected. A fifth step 550 includes providing buffered data to the PHY control after the PHY control has completed the wake up mode.

An embodiment includes the PHY control conveying transitions from the wake up to a data transfer mode to the MAC through a data indicator. As described, the MAC can buffer data while the PHY powers up from the low-power mode. For one embodiment, the MAC buffers data until it receives an indicator that the PHY has powered up. For another embodiment, the MAC buffers data according to a predetermined time delay, wherein the predetermined time delay is selected to ensure the PHY has power up before sending data the MAC buffered data.

Figure 6A:
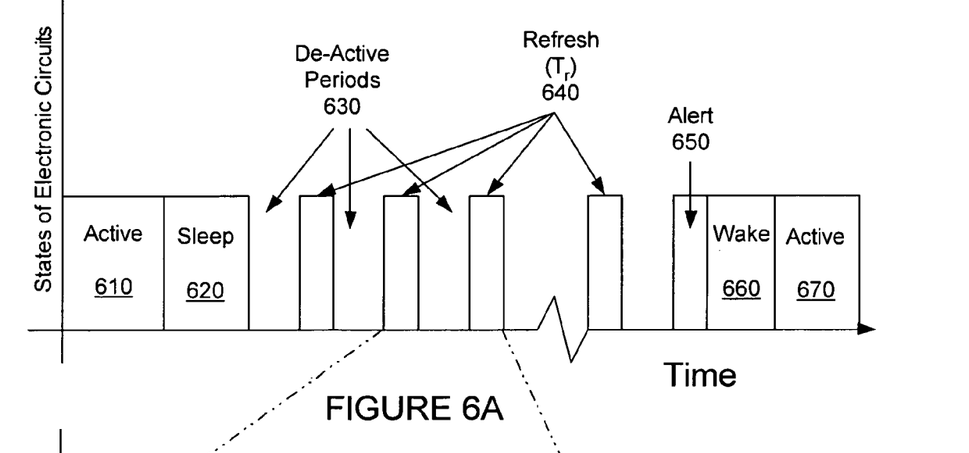
FIG. 6A shows a timeline depicting the states (active, de-active) of the majority of the electronic circuitry of data ports.

FIG. 6A is a time-line showing an example of interaction and communication of signals between data ports of a communication system. One or both of the data ports can include the embodiments for interfacing physical layer (PHY) control with media access control (MAC) within the data ports. The time-line begins with the electronic circuitry of one or both of the data ports being deactivated. The time-line includes a series of refresh signals (Tr is the period of each refresh signal) that include synchronization test signals that allow the data ports to maintain synchronization. As previously described, transmission and reception of the refresh signals requires the activation of at least some (for example, timing circuits), but not all, of the electronic circuitry.

The synchronization signals can include, for example, a series of idle symbols that have been properly encoded according to a selected protocol. The selected protocol can be, for example, 100BASE-T (Fast Ethernet), 1000BASE-T (Gigabit Ethernet), or 10GBASE-T.

Figure 6B:
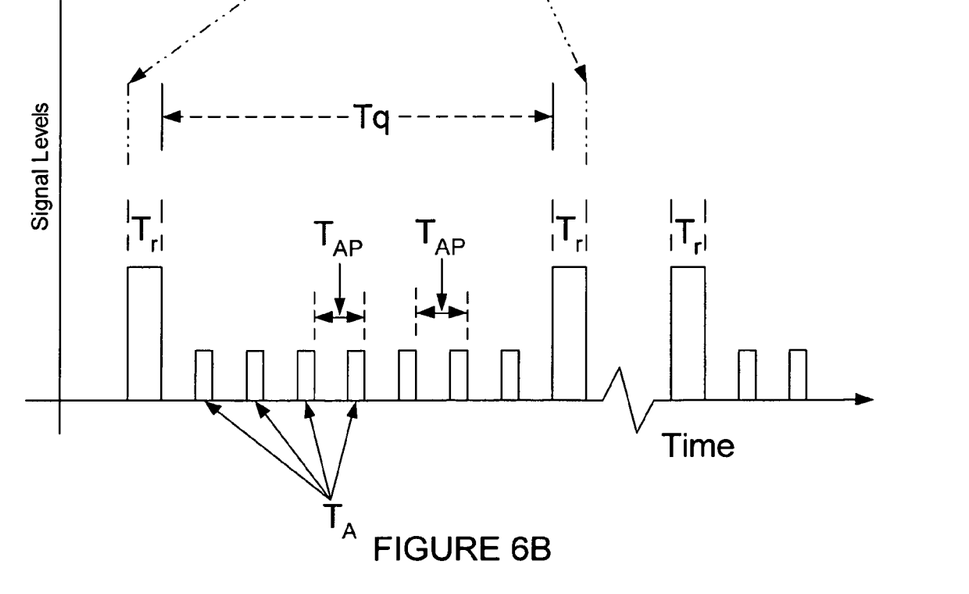
FIG. 6B is a time-line showing an example of interaction and communication of signals between data ports of a communication system.

A period of time between refresh signals can be designated as a quiet period Tq (see also FIG. 6B). During the quiet period, minimal electronic circuitry is activated, allowing reduction in power consumption of the electronic circuitry of the transceivers. The quiet period Tq can be selected to be large enough to allow the electronic circuitry to be successfully powered down (deactivated) and the subsequently powered up (activated). When fully powered down, the electronic circuitry conducts virtually no current, resulting is reduced power consumption.

The reduced power consumption $P_{LP}$ (low power) of the transceivers can be approximated as:

$P_{LP}=(P_{Nominal})\times(Tr/Tq)+Pq$, where $P_{Nominal}$ is the power consumption of the transceiver during normal active operation, and Pq is the power (very small) of the transceiver when the electronic circuitry is deactivated (quiet).

As can be observed, the ratio of Tr to Tq should be as small as possible. Tq is generally limited by clock drifts between two transceivers. Tr is generally limited by a minimum number of symbols required for processing engines adaptation. The processing engines adaptation can include, for example, timing and adaptation of filtering circuits.

When a data port senses that the data port has data for transmission to the other data port, the data port transmits an alert signal to the other data port. Upon receiving the alert signal, the other data port initiates a "wake up" period in which the deactivated electronic circuitry is reactivated. This can include, for example, activating decoders and near-end noise cancellers. When the electronic circuitry is fully activated, data between the data port begins.

FIG. 6A shows a timeline depicting the states (active, deactive) of the majority of the electronic circuitry. More specifically, the timeline shows a time period 610 in which the electronic circuitry is active, a time period 620 referred to as sleep in which the electronic circuitry is in process of being de-activated, and time periods 630 in which the majority of the electronic circuitry is de-activated. The previously shown and described refresh periods 640 occur while the majority of the electronic circuitry is de-active. An alert signal 650 prompts a wake up period 660. Following the wake up period 660 is another active region 670, in which the electronic circuitry is again active.

FIG. 6B also shows alert signal slots $T_A$ in which alert signal can be transmitted. Also depicted is an alert signal period $T_{AP}$ between alert signal slots. Generally, the more frequently the alert signal slots occur, the lower the latency of the reactivation of the electronic circuitry required for data transmission. As previously described, if $T_{AP}$ is zero, then the alert signals can occur at any time. For low latency, $T_{AP}$ is substantially less than Tq. Note that the alert signal slots $T_A$ are slot in which an alert signal can occur if data is ready for transmission. That is, an alert signal does not occur during each of the alert signal slots $T_A$.

Figure 7:
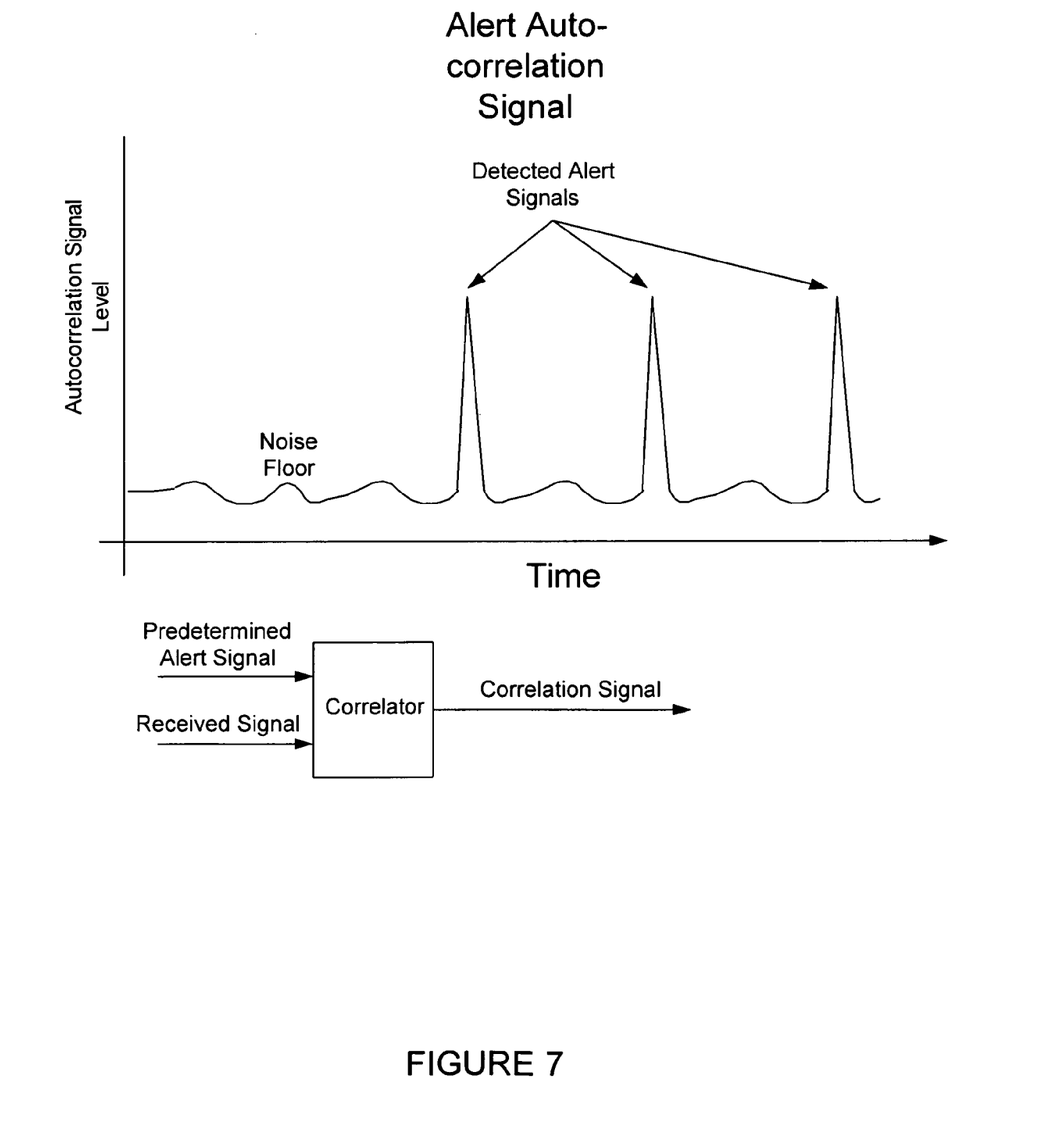
FIG. 7 shows a timeline that depicts an example a received signal that has been correlated with a predetermined alert signal.

FIG. 7 shows a timeline that depicts an example a received signal that has been correlated with a predetermined alert signal. The time line shows several instances in which an alert signal has been received and detected. A correlator receives a receive signal and correlates with a predetermined alert signal. When an alert signal is the receive signal, the correlator generates a peak in its output signal. The greater the amplitude of the output of the correlator, the more tightly the receive signal correlates with the predetermined alert signal, and therefore, indicating the reception of an alert signal.

As previously described, an embodiment includes the signal patterns of alert signals of different transceivers being different. Therefore, a transceiver can differentiate its own alert signal from alert signals of other transceiver link partners.

Figure 8:
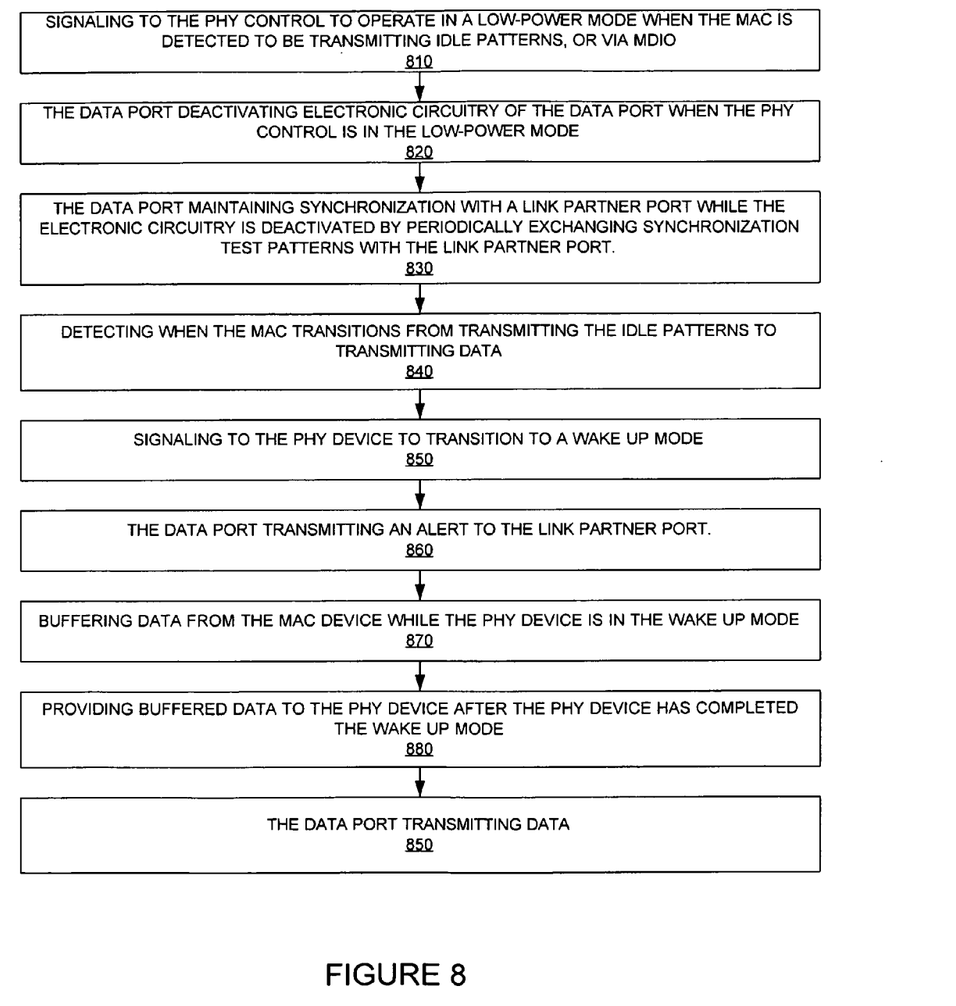
FIG. 8 is a flow chart that includes steps of one example of a method controlling electronic circuitry of a data port, the data port including physical layer (PHY) control interfaced with a media access control (MAC).

FIG. 8 is a flow chart showing steps of an example of a method of controlling electronic circuitry of a data port, the data port including physical layer (PHY) control interfaced with a media access control (MAC). A first step 810 includes signaling to the PHY control to operate in a low-power mode when the MAC is detected to be transmitting idle patterns, or as previously described, through pins of an MDIO interface. A second step 820 includes the data port deactivating electronic circuitry of the data port when the PHY control is in the low-power mode. A third step 830 includes the data port maintaining synchronization with a link partner port while the electronic circuitry is deactivated by periodically exchanging synchronization test patterns with the link partner port. A fourth step 840 includes detecting when the MAC transitions from transmitting the idle patterns to transmitting data. When the transition is detected, a fifth step 850 includes signaling to the PHY control to transition to a wake up mode. A sixth step 860 includes the data port transmitting an alert to the link partner port. A seventh step 870 includes buffering data from the MAC while the PHY control is in the wake up mode. An eighth step 880 includes providing buffered data to the PHY control after the PHY control has completed the wake up mode. A ninth step 890 includes the data port transmitting data. It is to be understood that the steps 810-890 can (in fact, typically) loop from step 890 back to step 810).

The previously mentioned timing circuits can include, for example, master/slave clocking circuitry. For a link partner pair, one of the transceivers can be designated as a master, and the other transceiver can be designated as a slave. For an embodiment, the master clocking circuitry of the master transceiver uses a common reference clock for receive and transmit circuitry, whereas slave circuitry of the slave transceiver typically includes a phase-locked loop for synchronizing to a master clock of master transceiver.

Synchronization between master and slave transceivers is generally required to ensure reliable initialization between the master and slave link partners. Current status information of a link partner allows for a reliable prediction of next stage and/or action by the link partner. In some embodiments, the slave transceiver provides the master transceiver with slave clock signal information, allowing the master transceiver to adapt its processing.

For an embodiment, data communication between the first data port and the second data port includes a plurality wired connections connected to the first data port and the second data port, and the alert is transmitted over a subset of the plurality of wired connections. For example, a 10GBASE-T Ethernet data port typically includes four wire connections. The alert can be transmitted, for example, over one of the four wire connections.

Another embodiment further includes designating predetermined time slots, wherein an alert is only transmitted during at least one of the predetermined time slots. Embodiments include alerts only being transmitted during the designated time slots. However, many time slots can be designated. Alerts are only transmitted during at least one of the predetermined time slots when the transceiver determines data is ready for transmission. The transceiver receiving the alert only activates its electronic circuitry when receiving an alert from a link partner transceiver.

A time period between the predetermined time slots can be adaptively selected. The time period can be adaptively selected based on, for example, a buffer size of at least one of the first data port and the second data port. The more frequently the time slots occur, generally (assuming some other limit to the latency is not present) the less the latency required to activate the electronic circuitry needed for transmission. As will be described later, as the period between time slots decreases, the more frequently alerts are allowed to be transmitted, and therefore, the latency decreased. If the period between time slots is decreased to zero, then there are not time constraints on when an alert can be transmitted.

Different protocols can have different latency requirements. That is, for example, 10BASE-T will typically have a different latency requirement than 100BASE-T (Fast Ethernet). As previously described, the latency requirements can dictate to some extent, limits to the time period between the predetermined time slots.

A time-duration of the predetermined time slots can be adaptively selected based on, for example, required operational speeds of, for example, 100BASE-T (Fast Ethernet), 1000BASE-T (Gigabit Ethernet), and 10GBASE-T protocols. Other considerations include, for example, target values for false alarms detection or/and misdetection of the alert signal.

If an alert is transmitted in one direction between link partner transceivers and data communication is being received in the opposite direction, the alert signal can be subjected to large amounts of interference. As such, embodiments include defining the alert signal to have a high-auto-correlation feature.

An embodiment includes the signal formats of the alert signals of different transceivers being selected to have low cross-correlation between each other. This can be useful, for example, if two transceivers simultaneously transmit alert signals during a quiet period in which the transceivers have deactivated electronic circuitry. The deactivated circuitry can include echo cancellation circuitry. Therefore, an alert signal transmitted by a transceiver may have a large echo signal due to the fact that the echo cancellation circuitry is deactivated. However, the transceiver can determine that the echo signal of the alert signal is not an alert signal of another transceiver because the signal formats of the different transceivers have low cross-correlation. That is, the transceiver can readily detect whether a received alert is an echo of its own alert signal, or an alert signal of another transceiver based on the degree of correlation between its own alert signal and the received signal.

Another embodiment includes the alert signal being transmitted on different pairs of the communication cable by link partners. As previously described, the cable between link partners can include four twisted pair connections. During an Auto-Negotiation stage two link partners can determine their roles as master and slave transceivers. That is, one of the transceivers is designated as the master, and the other transceiver is designated as the slave. Each link partner (master and slave) sends the alert signal on predetermined (different) pair of wires (lanes). For example, the master can sends its alert signal on a first lane A and the slave can sends its alert on another lane C. This can be useful, for example, if two transceivers simultaneously transmit alert signals during a quiet period in which the transceivers have deactivated electronic circuitry. The deactivated circuitry can include echo cancellation circuitry. Therefore, an alert signal transmitted by a transceiver may have a large echo signal due to the fact that the echo cancellation circuitry is deactivated. However, the transceiver can determine that the echo signal of the alert signal is not an alert signal of another transceiver transmits alert on different lane (wired pair or channel).

Embodiments include configuring the alert to include a high-autocorrelation signal that ensures the desired level of autocorrelation of the alert. This can be accomplished by selecting a signal format of the alert. For an embodiment the alert signal is selected to have an autocorrelation signal level at least a predetermined amount greater than a received noise level (the received noise can include thermal noise and echo signals). The alert signal level and the echo signal interference can be measured, for example, at a receiving port of the alert signal.

An embodiment includes configuring the alert to have a baud rate less than a baud rate of the data transmission. Typically the insertion loss of, for example, the copper wire links between the link partners increases with frequency. Therefore, higher frequency signals suffer greater insertion loss when transmitted over the wired link. By selecting a lower baud rate for the alerts, the alert signals typically suffer less insertion loss when transmitted across the link between link partners. Therefore, detection of alert signals is generally more effective because alert signals suffer less attenuation when traveling across the link between link partner transceivers.

As previously described, the majority of electronic circuitry of the transceivers can be deactivated during the sleep period (period in which data is not available or present for transmission). The electronic circuitry can include, but is not limited to, Echo cancellers, NEXT (near-end cross-talk cancellers, FEXT (far-end cross-talk) cancellers, DFE (decision feedback equalizer) or FFE (feed forward equalizer), and Error-Correction Encoders and Decoders. Also as previously described, at least some circuitry is activated during the refresh periods. For example, timing circuitry can be activated to allow synchronization signals to be transmitted between the transceivers to enable the transceivers to maintain synchronization.

Although specific embodiments have been described and illustrated, the described embodiments not to be limited to the specific forms or arrangements of parts so described and illustrated. The embodiments are limited only by the appended claims.

What is claimed:

1. A method of interfacing physical layer (PHY) control with media access control (MAC), comprising:
    signaling, by an interface, to the PHY control to operate in a low-power mode when the MAC is detected to be transmitting idle patterns;
    detecting, by the interface, when the MAC transitions from transmitting the idle patterns to transmitting data, comprising detecting idle patterns occurring above a threshold percentage of time over a period of time, and signaling to the PHY control to operate in the low-power mode;
    when the transition is detected, signaling, by the interface, to the PHY control to transition to a wake up mode;
    buffering data from the MAC while the PHY control is in the wake up mode;
    providing, by the interface, buffered data to the PHY control after the PHY control has completed the wake up mode; and
    adjusting a variable latency of data propagating from the MAC to the PHY, by the interface, by selecting a size of a variable buffering queue of the buffering data from the MAC based on how long it takes the PHY control to reactivate after de-activation.

2. The method of claim 1, wherein signaling to the PHY control to operate in a low-power mode when the MAC is detected to be transmitting idle patterns, comprises:
    detecting a threshold number of consecutive idle patterns;
    signaling to the PHY control to operate in the low-power mode.

3. The method of claim 1, wherein detecting when the MAC transitions from transmitting the idle patterns to transmitting data comprises:
    detecting data occurring above a threshold percentage of time.

4. The method of claim 1, wherein detecting when the MAC transitions from transmitting the idle patterns to transmitting data comprises:
    detecting a threshold number of data.

5. The method of claim 1, further comprising depleting the variable buffering queue when idle patterns are received.

6. A method of controlling electronic circuitry of a data port, the data port including physical layer (PHY) control interfaced with a media access control (MAC), comprising:
signaling to the PHY control to operate in a low-power mode when the MAC is detected to be transmitting idle patterns;
the data port deactivating electronic circuitry of the data port when the PHY control is in the low-power mode;
the data port maintaining synchronization with a link partner port while the electronic circuitry is deactivated by periodically exchanging synchronization test patterns with the link partner port;
detecting when the MAC transitions from transmitting the idle patterns to transmitting data, comprising detecting idle patterns occurring above a threshold percentage of time over a period of time, and signaling to the PHY control to operate in the low-power mode;
when the transition is detected, signaling to the PHY control to transition to a wake up mode;
the data port transmitting an alert to the link partner port;
buffering data from the MAC while the PHY control is in the wake up mode;
providing buffered data to the PHY control after the PHY control has completed the wake up mode;
the data port transmitting data;
adjusting a variable latency of data propagating from the MAC to the PHY by selecting a size of a variable buffering queue of the buffering data from the MAC based on how long it takes the PHY control to reactivate after deactivation
designating predetermined time slots;
transmitting the alert during at least one of the predetermined time slots;
adaptively selecting a time period between the predetermined time slots, wherein the time period between the predetermined time slots is adaptively selected based on at least one of the size of the variable buffering queue and a buffer size of the link partner port.

7. The method of claim 6, further comprising adaptively selecting a time-duration of each of the predetermined time slots, wherein the time-duration of the predetermined time slots is adaptively selected based on a desired latency of data transmission.

8. A method of interfacing physical layer (PHY) control with media access control (MAC), comprising:
signaling to the PHY control to operate in a low-power mode when the MAC provides a low-power mode indicator;
the MAC buffering data of the MAC;
receiving an indicator that the MAC is transitioning from transmitting idle patterns to transmitting data, wherein the indicator is determined by detecting idle patterns occurring above a threshold percentage of time over a period of time, and signaling to the PHY control to operate in the low-power mode;
when the transition is detected, signaling to the PHY control to transition to a wake up mode;
providing buffered data to the PHY control after the PHY control has completed the wake up mode; and
adjusting a variable latency of data propagating from the MAC to the PHY by selecting a size of a variable buffering queue of the buffering data from the MAC based on how long it takes the PHY control to reactivate after deactivation.

9. The method of claim 8, further comprising the MAC buffering data while the PHY powers up from the low-power mode.

10. The method of claim 9, wherein the MAC receives an indicator that the PHY has powered up.

11. The method of claim 9, wherein the MAC buffers data according to a predetermined time delay, wherein the predetermined time delay is selected to ensure the PHY has powered up before sending the MAC buffered data.

12. An interface that interfaces a physical layer (PHY) control with a media access control (MAC), the interface operative to:
signal to the PHY control to operate in a low-power mode when the MAC is detected to be transmitting idle patterns;
detect when the MAC transitions from transmitting the idle patterns to transmitting data, comprising detecting idle patterns occurring above a threshold percentage of time over a period of time, and signaling to the PHY control to operate in the low-power mode;
when the transition is detected, signal to the PHY control to transition to a wake up mode;
buffer data from the MAC while the PHY control is in the wake up mode;
provide buffered data to the PHY control after the PHY control has completed the wake up mode; and
adjusting a variable latency of data propagating from the MAC to the PHY, by the interface, by selecting a size of a variable buffering queue of the buffering data from the MAC based on how long it takes the PHY control to reactivate after de-activation.

* * * * *